Jan. 17, 1928.
K. A. ENZ
1,656,184
VALVE
Filed Dec. 20, 1924 — 5 Sheets-Sheet 4
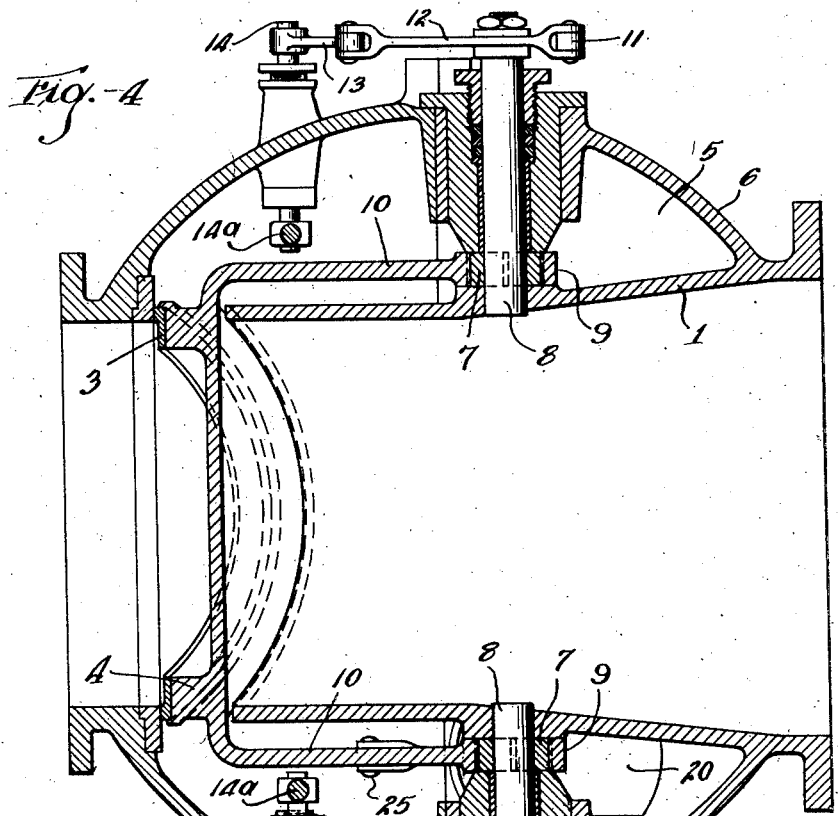
Fig.-4
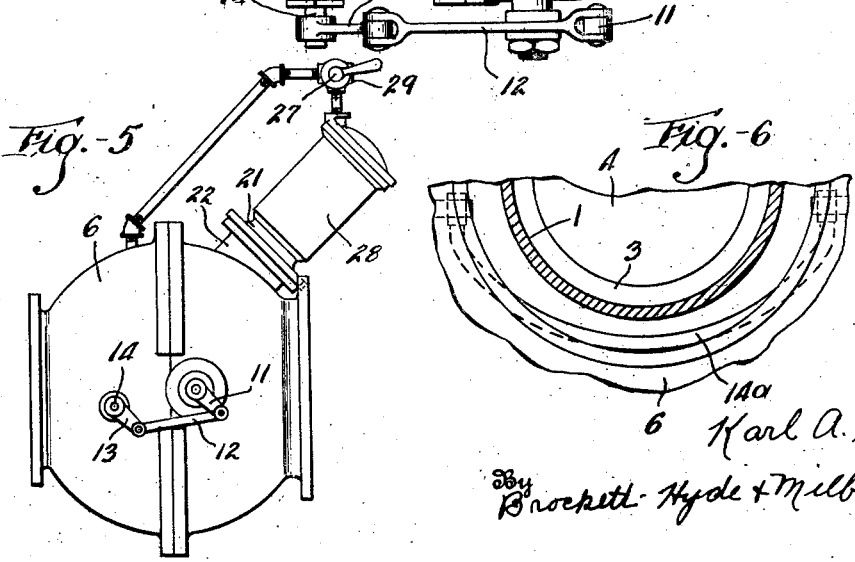
Fig.-5
Fig.-6
Inventor
Karl A. Enz
By Brockett, Hyde & Milburn
Attorneys

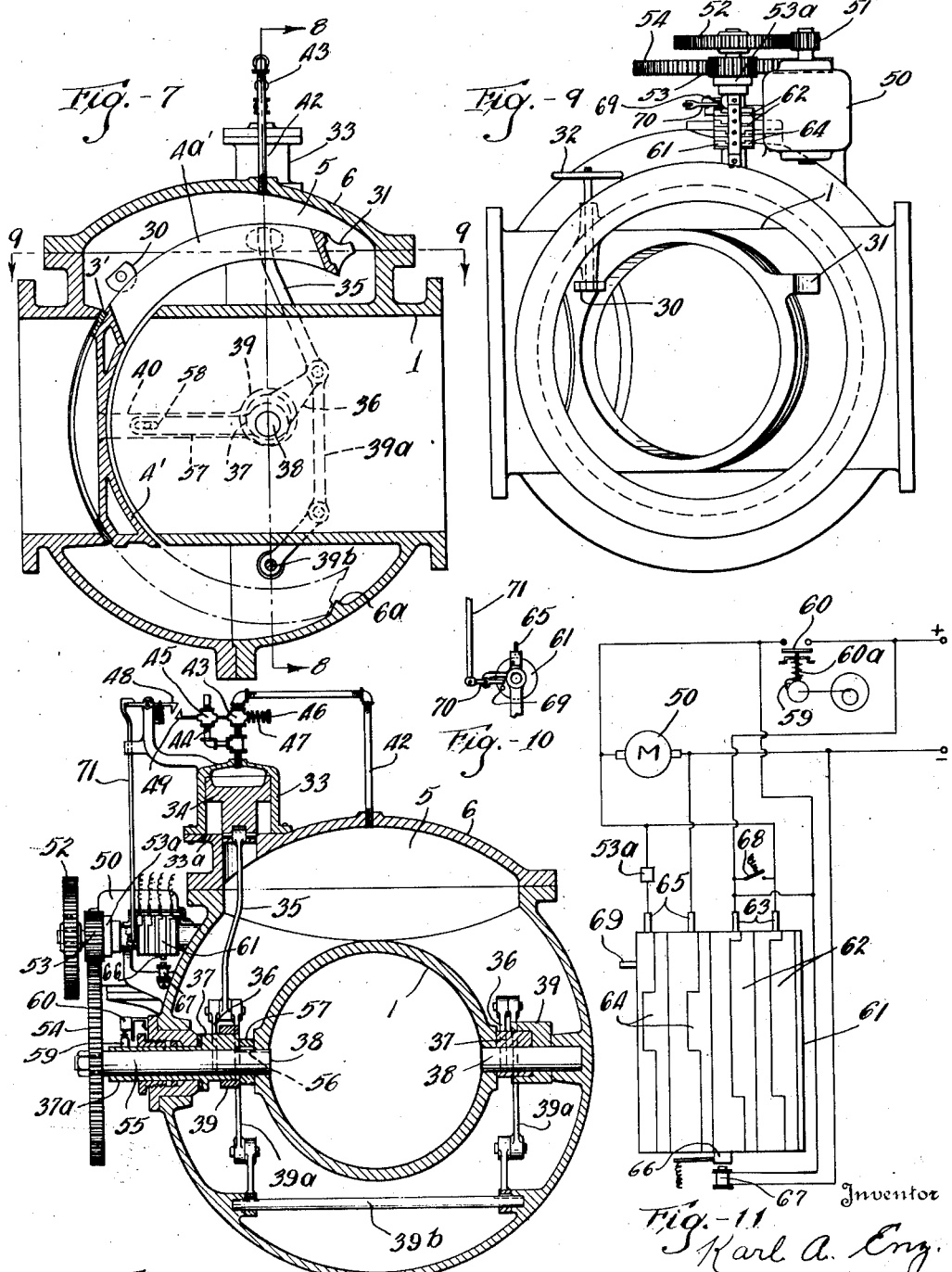

Patented Jan. 17, 1928.

1,656,184

UNITED STATES PATENT OFFICE.

KARL A. ENZ, OF CLEVELAND, OHIO.

VALVE.

Application filed December 20, 1924. Serial No. 757,216.

This invention relates to improvements in valve structures and operating mechanism therefor for controlling the flow of any fluid as for instance water, steam or gases, and is especially adapted for use in connection with the water-way of a hydraulic turbine or irrigation system.

The objects of the present invention are to provide such a valve structure which is leak-proof and which can be easily operated and which at the same time does not reduce the section or area of the water-way or other fluid conduit when it is swung into open position; to provide also a valve structure which is substantially free from accident to the mechanism which might otherwise be caused by lodging of solid material between the valve itself and the walls of the fluid conduit, the valve and operating arms therefore being in the present case located entirely outside of the tubular portion of the conduit when the valve occupies open position.

More specifically, the present form of device consists in a disc or valve and valve seat therefor which are provided with interengaging portions of substantially cylindrical form or characteristic, and in which the valve itself is adapted to be seated or unseated by movement in a direction substantially normal to the general plane of the valve seat and which is adapted to be swung into and out of registry or alignment with the valve opening. That is to say, in opening the valve it is first completely unseated by substantially straight-line movement away from the valve seat and then swung bodily about a center into fully open position; then in order to close the valve, it is first swung into registry or alignment with the valve opening and then brought again into effective seating engagement by a straight-line movement.

This application is a companion to other applications being filed of even date. As above noted, the valve itself in the present case is of substantially cylindrical form, the valve seat being of corresponding form, and the valve itself together with the operating arms therefor are swung entirely outside of the limits of the tubular portion of the water-way or other fluid conduit. The arms themselves by which the valve is swung are located outside of the tubular conduit at all times, as will be clearly understood from the more detailed description and drawings.

Other objects of the present invention will appear from the following description and claims when considered together with the accompanying drawings.

Figure 1:
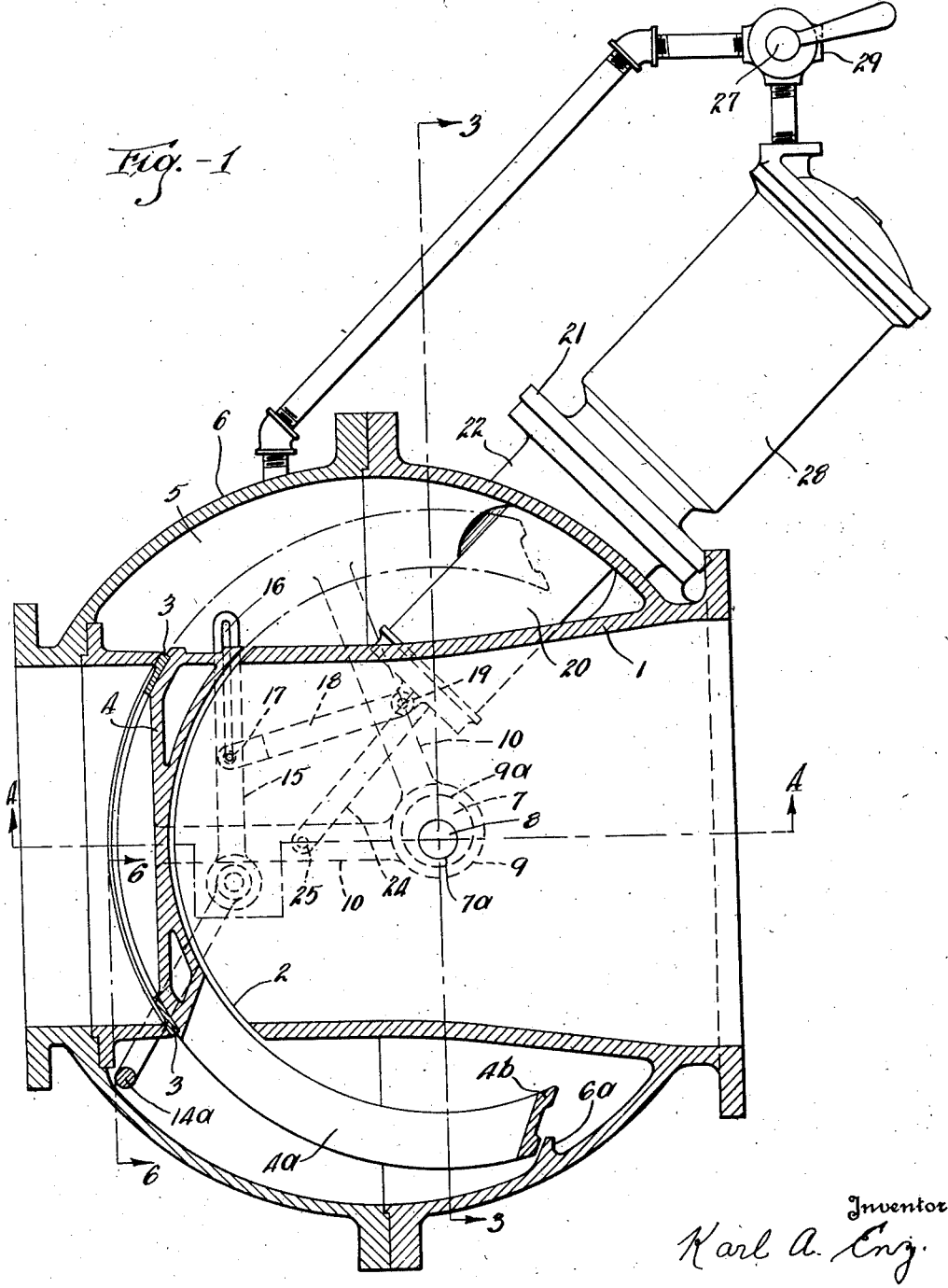
Figure 2:
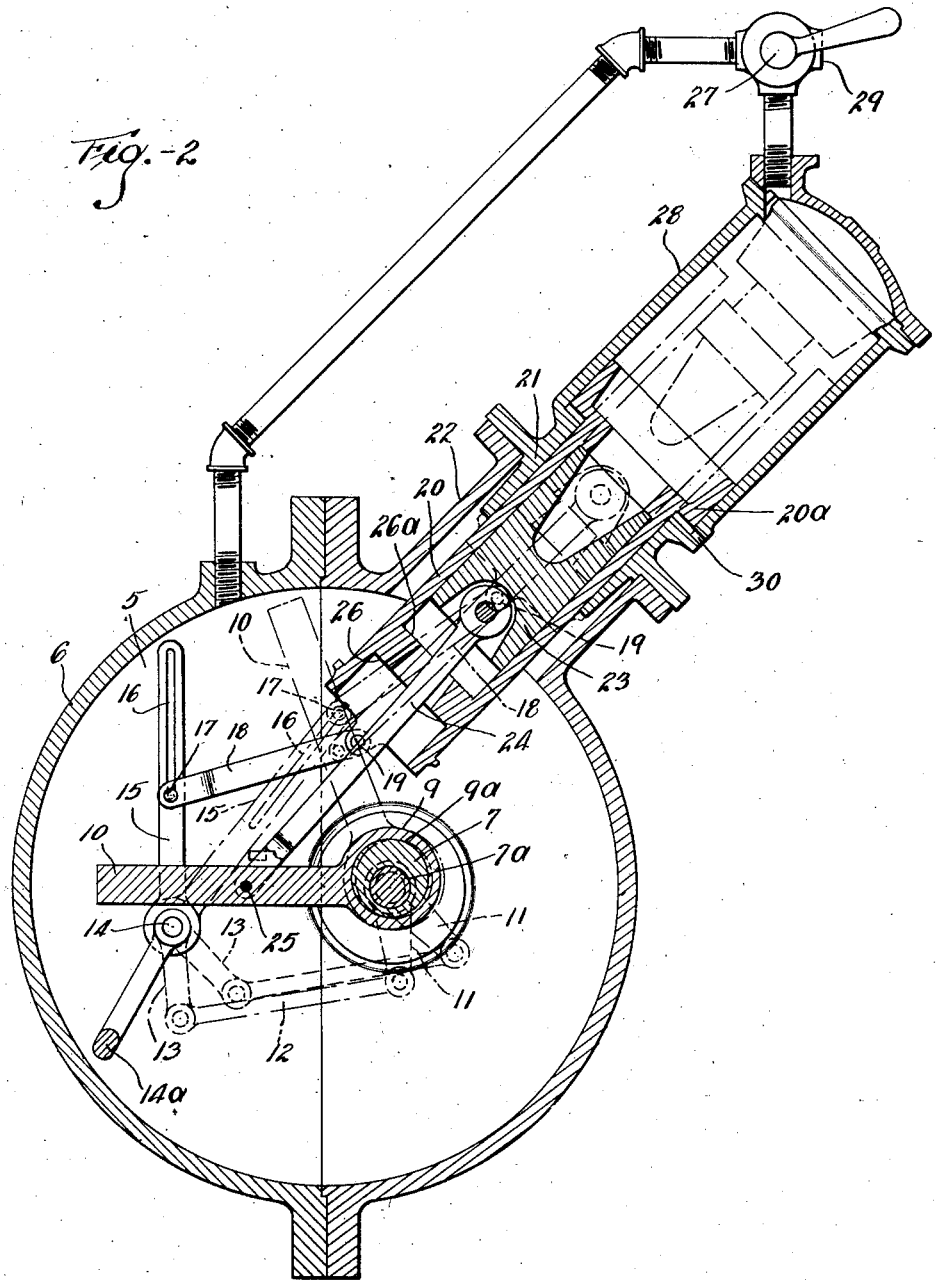
Figure 3:
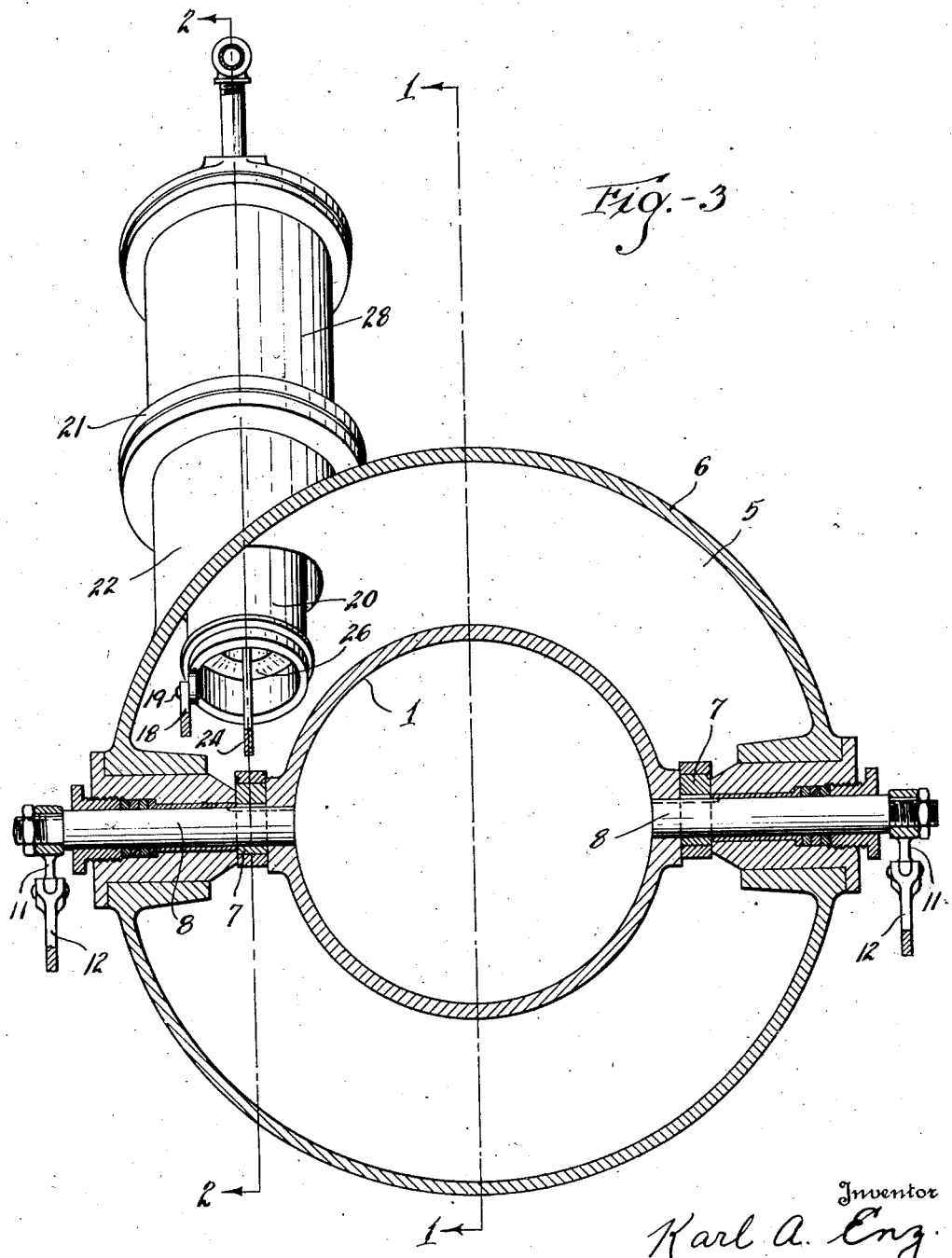

Fig. 1 is a view partly in section and partly in elevation taken on line 1—1 of Fig. 3; Fig. 2 is a sectional view taken on line 2—2, Fig. 3; Fig. 3 is a view taken on line 3—3 of Fig. 1; Fig. 4 is a sectional view taken on line 4—4 of Fig. 1; Fig. 5 shows my improved device in elevation; Fig. 6 is a detail partial view on line 6—6, Fig. 1; Fig. 7 is a sectional view of a modified form; Figs. 8 and 9 are sections taken on line 8—8 and 9—9 respectively of Fig. 7; Fig. 10 is a detail view of a trip mechanism; and Fig. 11 is a wiring diagram of the electric automatic control.

The fluid conduit in the present case comprises in part the tubular portion 1 which is provided with a transverse opening or cutout portion indicated by reference numeral 2 and is provided with a valve seat 3 for interengagement with the correspondingly formed annular surface of the disc or valve 4. The interengaging portions of the valve and valve seat are in the present case of substantially cylindrical form, and suitable gaskets may be provided upon both the valve and valve seat. The opening 2 is of substantially greater width than the width or thickness of the valve itself so as to permit straight-line movement of the valve in the same direction as the direction of flow, or in other words, in a direction substantially normal to the general plane of the opening, this straight-line movement of the valve being for the purpose of completely unseating the valve prior to swinging the same about a center to a completely open position. The tubular portion 1 is surrounded by a chamber 5 enclosed within the casing 6, the valve being adapted to be swung into the chamber 5, as indicated in dotted lines in Fig. 1. The valve comprises what might be termed a full portion which constitutes the effective portion of the valve itself and also an open or skeleton portion 4ª which serves to maintain the valve in proper operative relation with respect to the valve opening when the valve occupies fully open position, and which serves also to provide a stop means for limiting the swinging movement of the valve to position in alignment with the valve opening. The extreme end of the skelton portion 4ª is adapted to contact the abutment 6ª formed on the inside wall of the casing 6 so as to limit the movement of the valve when it is swung to closed position, as indicated in Fig. 1. The extreme end portion 4ᵇ of the skelton 4ª is adapted to be raised slightly from the abutment 6ª when the valve is moved in straight line to fully seating engagement.

The means for unseating the valve prior to swinging the same to fully open position comprises eccentrics 7 which are fixedly mounted upon stub shafts 8 on two sides of the tubular conduit, these eccentrics working in and being adapted to actuate the annular straps or stirrups 9 upon the end portions of the operating arms 10 of the valve. As clearly illustrated in the drawings, the side operating arms 10 extend along the outside of the tubular portion of the fluid conduit and are therefore out of the direct path of the flow of water or other fluid. The stub shaft 8 is operated in each case by means of the crank arm 11 fixed thereto, which crank arm in each case is pivotally connected to one end of the lever arm 12. This lever arm is in each case connected to a crank arm 13 which is secured to stub shaft 14 mounted in the casing wall 6. The inner end of the stub shaft 14 on one side has fixedly mounted thereupon the lever arm 15 which has its one end portion slotted as at 16 for co-operation with the pin 17 carried by the lever arm 18. The lever arm 18 has its other end pivotally connected as at 19 to one end of the outer operating cylinder 20 which is adapted for straight-line movement through the collar 21 which in turn is suitably mounted within the projecting portion 22 provided on the casing wall 6. Suitable actuating means is provided for movement of the operating cylinder 20, as will be later explained; so that upon movement of the cylinder 20 in one direction, the eccentrics 7 will be actuated so as to unseat the valve prior to swinging the same to fully open position the bail-shaped arm 14ª connecting the shafts 14 so that they are operated together. Such unseating operating of the valve is effected by upward movement of the cylinder 20, according to Fig. 2 of the drawings, and as indicated in dotted lines therein.

The means for swinging the gate to fully open position after it has been unseated comprises an inner plunger or piston 23, which is adapted for straight-line movement and which is provided with suitable actuating means, as will be later explained. The one end of the plunger 23 has pivotal connection with the connecting rod or bar 24, the other end of which is pivotally connected as at 25 to one of the side operating arms 10 which are connected directly to the valve. Thus, upon movement of the plunger 23 upwardly, as viewed in Fig. 2, the valve or disc will be swung to fully open position and reversely upon movement of the plunger 23 in the opposite direction the gate will be swung into registry or alignment with the valve opening prior to seating of the same for closing.

As a means for actually operating the cylinder 20 and the plunger 23, I utilize the pressure of the water or other fluid itself within the chamber 5, such pressure being exerted upon the end of the cylinder 20 and also upon the annular shoulder 26 so as to move the same upwardly as viewed in Fig. 2. Such operation is effected by setting the two-way valve 27 in such position as to permit discharge or release of pressure from the cylinder extension 28 out through the discharge opening 29. An air port or vent 30 is provided also so as to facilitate such movement of the plunger 20 as the enlarged end portion 20ª thereof slides along in engagement with the inner wall of the cylinder 28. During the initial movement of the cylinder 20 in such manner as just now described, the valve is unseated by a straight-line movement, as already described, and upon further movement of the plunger 20 in the same direction and by the same means, the opposite shoulder 26ª engages the corresponding end of the plunger 23 so as to thereupon move the same upwardly, as viewed in Fig. 2. Such movement of the plunger 23, as before explained, serves to actuate through the connections already described the operating side arms 10 for the purpose of swinging the valve to fully open position. It should be explained that during the unseating operation, which is effected by the eccentrics 7, the eccentrics are rotated about the points 7ª; whereas during the swinging movement, just now referred to, the stirrups or straps 9 are rotated about the points 9ª. So that after completion of the unseating operation, the eccentrics themselves are not moved but the straps or stirrups are rotated about the same during the swinging movement to first fully open the valve and then to return the same to position in alignment with the valve opening, such return movement serving to bring the straps or stirrups back to the same relative position with respect to the eccentrics as they occupied upon completion of the unseating operation, and as is necessary for them to occupy for proper performance of the seating operation. The swinging movement of the valve for opening the same is limited by the engagement of the enlarged portion 20ª of the cylinder 20 with the extreme end of the cylinder 28, and as before explained, the closing limit of the swinging movement is determined by engagement of the end portion 4ᵇ with the abutment 6ª. It is to be noted also that upon completion of the unseating movement by operation of the outer cylinder 20 in the manner already described and during the operation of the inner plunger 23 for the swinging movement, the pin 17 will slide along the slot 26 so as to create lost motion, and thereby prevent further actuation of the eccentrics 7. In other words, during the initial movement of the cylinder 20 for the unseating operation, the engagement of the pin 17 in the one end portion of the slot 16 is effective for actuating the lever 15 so as to operate the eccentric, these parts being so constructed and arranged as to permit such operation.

Thus it will be seen that I have provided an improved valve mechanism in which the valve is first effectively unseated prior to the swinging movement for opening the same, and reversely in which the valve is swung bodily into alignment with the valve opening prior to seating the same. In other words, the seating and unseating movements are separate and distinct from the swinging movements for opening and closing the valve. Furthermore, the unseating and swinging or opening movements are automatically performed in proper sequence after the actuating means is once set into operation. Furthermore, in the present form of device, the valve itself and the operating arms therefor are positioned entirely outside of the tubular portion of the fluid conduit so as not to interfere with the flow therethrough, and furthermore to thereby preclude the possibility and danger of damage to the parts by clogging or other interference of foreign matter. An opening with a closure may be provided, if desired, in the wall of the casing 6 at a point just below the cut-out portion 2, as viewed in Fig. 1, so as to permit removal of silt and other foreign matter which might settle through the opening 2 and collect in the outer casing.

It is to be understood that the form of water-way or other fluid conduit might be varied according to the spirit of my present invention, and that other means might be devised for performing the operations comprehended by my invention.

For instance, the disc or valve instead of swinging upwardly to open position, may be constructed and arranged to open by swinging downwardly, as viewed in Fig. 7, this modified form of mechanism being shown in Figs. 7 to 11. In this modified form, the valve is unseated and seated by hydraulic means, and is swung to and from registering position by electric means. Furthermore, upon completion of the unseating operation, the electric means is automatically actuated for opening the valve; and as soon as the valve is moved into registry with the opening, the hydraulic means is automatically actuated to seat the valve.

In this modification, the valve 4' does not have a cut-away portion as at 2 in the first form of device, but it is closed at this point so as to prevent rocks etc. from depositing in the path of the valve. The valve may in this modified form be cut away at its upper portion, as indicated at 2', which opening does not however occasion any obstruction to the opening movement of the valve. The lock 30 has a full portion for engagement either in the correspondingly shaped recess 31 to hold the valve in open position, or in a like recess for holding it closed, as indicated in Fig. 7. Rotation of the lock by means of the handle 32 will release the lock by removing the full portion from either recess, the opposite cut-away portion permitting the valve to open or close.

The seating and unseating operations are performed by means of the hydraulic motor 33 with its plunger 34 connected through the link or rod 35 to the crank arm 36 which in turn is connected to the eccentric 37 for operation thereof. This eccentric is mounted to revolve about the shaft 38 and by such movement actuates the stirrup or strap 39 which is part of the valve arm 40. The links 39$^a$ and shaft 39$^b$ afford a connection to the same means on the other side of the valve. With this mechanism the valve is unseated and seated, as will more clearly appear. The hydraulic motor 33 is actuated by the water or other fluid from the casing 6 through the pipe connection 42 which is provided with the valve 43. The branch discharge pipe 44 has the valve 45, and a common valve stem carries these valves so that by pressing the end 46 of the stem, against the spring 47, valve 43 can be opened and valve 45 simultaneously closed. The valves 43 and 45 are maintained in such positions by the snap engagement of latch 48 over the nose 49 of the valve stem, a spring normally forcing latch 48 downwardly but the relative inclination of the outer faces of the latch 48 and nose 49 serving to effect the snap engagement between these parts. Release of the latch 48, by a means to be later referred to, will permit the spring 47 to close valve 43 and open valve 45. With the valves held in this position, the pressure of the water or other fluid on the inner end of the piston will serve to return the valve to seating engagement through the reverse operation of the eccentric.

Associated with the hydraulic motor I have here shown a reversible electric motor 50 for swinging the valve. This movement is effected through the train of meshing gears 51, 52, 53, 54, the last-named gear being fixed to the shaft 55 which is suitably mounted in the casing walls. An electromagnetic clutch 53$^a$ is also included in the drive connections. Keyed upon shaft 55 at the point 56 is the arm 57, the other end of which has pin and slot connection 58 with the valve arm 40. The pin and slot permit substantially straight-line movement of the valve arm 40 for seating or unseating valve and at the same time permit swinging movement of the valve by rotation of the shaft 55.

As a means of automatically starting the electric motor upon completion of the unseating operation, I have provided the eccentric with an integral sleeve 37ª which extends out through the wall of the casing and carries a cam portion 59 to momentarily close the switch 60 and thereby complete the temporary circuit through the electric motor. A spring 60ª normally holds switch 60 open. As soon as motor 50 starts, the commutator drum 61 begins to rotate to first establish a permanent motor circuit through the contact portions 62 and the brushes 63. Then, further rotation of drum 61 closes the circuit through segments 64 and brushes 65 so as to energize the electromagnetic clutch 53ª for actual movement of shaft 55 and swinging of the valve. The contact segments are so arranged that when the valve has been fully opened the circuit through the clutch is broken, likewise the motor circuit is broken soon after, and a brake 66 is automatically applied to prevent coasting or over-running of the drum. During operation of the electric motor, the brake is held released by the electro-magnet 67 which is in the motor circuit.

When it is desired to close the valve, the operator momentarily holds the switch 68 closed so as to start motor 50, which is reversed and which at once establishes the permanent motor circuit by rotation of the drum 61 in the opposite direction. Then the circuit through the clutch is automatically closed and the valve is swung into registry with the valve opening. Upon completion of this swinging movement and automatic breaking of the clutch circuit, the pin 69 on the end of drum 61 in its upward movement strikes lever 70 which is pivotally connected at its other end to the lower end of trip arm 71. The upper end of trip 71 extends angularly above the free end of latch 48 so as to trip the same and release valve stem, upon downward movement of the trip. The valve 43 is thereby automatically closed and valve 45 opened so that the hydraulic pressure will be effective upon the inner end of the plunger 34 and cause seating of the valve. At this point, the electric motor is automatically cut out by the opening of the circuit at the brush 63 and the brake is automatically applied. The lock can then be applied to hold the valve securely closed against accidental movement, and the parts will remain in such position until performance of the opening operations which are initiated by pressing the head 46 of the valve stem, as above described.

In the present form of illustration the port 33ª, which is open to atmosphere, permits the escape and entrance of air as the piston is moved in opposite directions, although as above explained, other forms of actuating means may be employed for performing the operations in the manner herein set forth.

Having described my invention, I claim:

In a valve structure, a casing having a tubular conduit portion and forming a chamber thereabout, said tubular portion communicating with said chamber by a cylindrical opening circumferential of the conduit portion, a cylindrical valve pivotally mounted for swinging movement in said opening and having a full portion adapted to seat transversely of the conduit portion of said casing, and an open portion adapted to substantially close the opening of said conduit portion, an eccentric bearing for said valve adapted to impart bodily movement thereto longitudinally of said conduit portion for seating and unseating the valve, actuating means for said valve comprising a pair of pistons, one arranged for limited movement with the other, a connecting rod between one of said pistons and said valve for effecting said pivotal movement of the same, and connections between the other piston and said eccentric bearing for effecting said bodily movement of the valve, a portion of said casing projecting from said chamber to form a cylinder, an enlarged portion of the outer of said pistons being movable in said cylinder, means for admitting fluid from said chamber to said cylinder, and means for exhausting said fluid from said cylinder.

In testimony whereof I hereby affix my signature.

KARL A. ENZ.